United States Patent [19]

Will et al.

[11] 4,270,356
[45] Jun. 2, 1981

[54] TURBOCHARGED ENGINE AND METHOD OF OPERATING SAME

[75] Inventors: Heinz-Dieter Will; Werner Dommes; Hans-Werner Pölzl, all of Ingolstadt, Fed. Rep. of Germany

[73] Assignee: Audi NSU Auto Union AG, Neckarsulm, Fed. Rep. of Germany

[21] Appl. No.: 943,816

[22] Filed: Sep. 19, 1978

[30] Foreign Application Priority Data

Sep. 20, 1977 [DE] Fed. Rep. of Germany ....... 2742251
Oct. 7, 1977 [DE] Fed. Rep. of Germany ....... 2745153

[51] Int. Cl.³ .............................................. F02B 37/00
[52] U.S. Cl. .................................... 60/602; 251/121; 251/210; 251/359
[58] Field of Search ................ 60/600, 601, 602, 603; 251/121, 123, 210, 359

[56] References Cited

U.S. PATENT DOCUMENTS

| 973,551 | 10/1910 | Osborne | 251/210 |
|---|---|---|---|
| 3,906,729 | 9/1975 | Connor et al. | 60/602 X |
| 4,075,849 | 2/1978 | Richardson | 60/602 |
| 4,120,156 | 10/1978 | McInerney | 60/602 |

FOREIGN PATENT DOCUMENTS

| 905020 | 2/1954 | Fed. Rep. of Germany | 251/210 |
|---|---|---|---|
| 281488 | 10/1931 | Italy | 251/210 |

*Primary Examiner*—Michael Koczo, Jr.
*Attorney, Agent, or Firm*—Karl F. Ross

[57] ABSTRACT

A turbocharged engine system has an internal-combustion engine whose exhaust gases drive a turbine at a speed generally proportional to the exhaust-gas pressure. This turbine in turn drives a supercharger that feeds air to the engine intake at a pressure that is generally proportional to the turbine speed. A bypass valve connected across the turbine is opened above a predetermined engine speed to shunt the exhaust gases around the turbine and thereby prevent excessive supercharging of the engine. The pressure of the engine exhaust gases is, however, decreased steadily and proportionately with increasing engine speed above a predetermined second engine speed to operate the engine with an intake-manifold pressure that is slightly below that at which knocking would occur for increased horsepower output.

7 Claims, 6 Drawing Figures

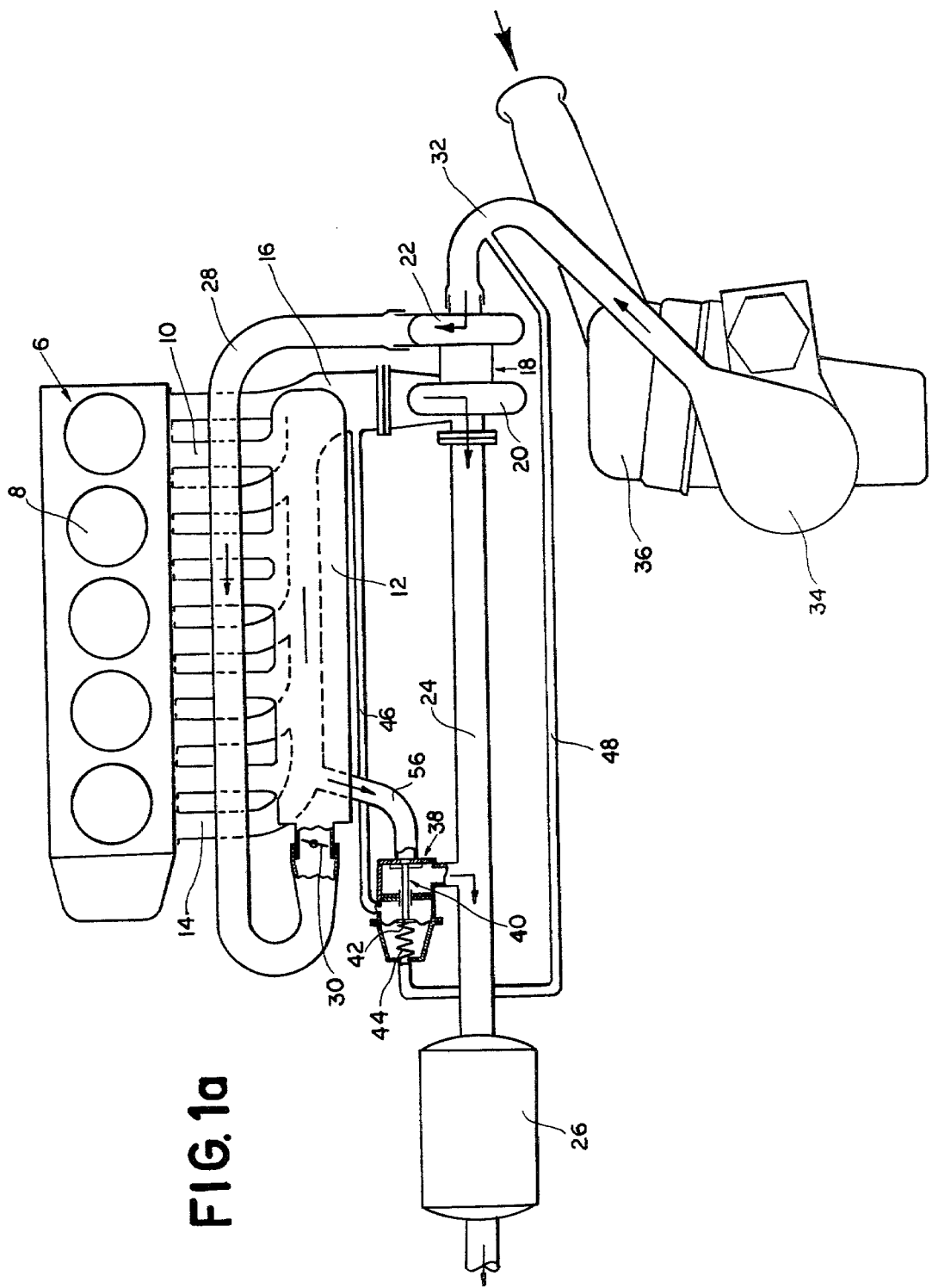

ically assigned and copending application 898,416 filed 20 Apr. 1978 whose entire disclosure is herewith incorporated by reference, to provide a relatively small and fast-acting turbine for the exhaust gases so that even at relatively low engine speed the turbocharger operates with maximum efficiency. A shunt or bypass valve is provided across this turbine and is set up so that it opens above a predetermined engine speed to reduce the exhaust-gas pressure driving the turbine and thereby prevent the turbine from overdriving the supercharger. Such overdriving of the supercharger would lead to the feeding of excessive air to the intake manifold, which would inevitably lead to knocking. In a fuel-injected system where the fuel injector is provided upstream of the supercharger such a system could even result in spontaneous ignition of the fuel-air mixture in the intake manifold, resulting in an explosion that could have disastrous results.

TURBOCHARGED ENGINE AND METHOD OF OPERATING SAME

FIELD OF THE INVENTION

The present invention relates to a turbocharged engine system and a method of operating the same. More particularly this invention concerns such a system having a shuntable exhaust-gas turbine.

BACKGROUND OF THE INVENTION

A turbocharged engine typically has a turbine that is driven by the normally high-pressure exhaust gases of the engine, and hence has its intake connected to the engine exhaust-gas manifold, and a supercharger or compressor that is driven by this exhaust-gas turbine and in turn has its output connected to the engine intake manifold. Thus the energy in the exhaust gases is used to drive the compressor that increases the amount of air fed to the engine so as to increase the fuel/air charge for the engine and thereby increase its torque and horsepower.

The above-described very simple system in reality is not used often, in particular for a motor vehicle where the engine RPM (revolutions per minute) varies very widely. The simple system operates efficiently only in a very narrow range, so that the user can only rely on the increased power given by such a turbocharged engine in this narrow range.

It is standard practice, as described in the commonly assigned and copending application 898,416 filed 20 Apr. 1978 whose entire disclosure is herewith incorporated by reference, to provide a relatively small and fast-acting turbine for the exhaust gases so that even at relatively low engine speed the turbocharger operates with maximum efficiency. A shunt or bypass valve is provided across this turbine and is set up so that it opens above a predetermined engine speed to reduce the exhaust-gas pressure driving the turbine and thereby prevent the turbine from overdriving the supercharger. Such overdriving of the supercharger would lead to the feeding of excessive air to the intake manifold, which would inevitably lead to knocking. In a fuel-injected system where the fuel injector is provided upstream of the supercharger such a system could even result in spontaneous ignition of the fuel-air mixture in the intake manifold, resulting in an explosion that could have disastrous results.

Thus the bypass valve is normally urged into the closed position by a spring, and can be operated by a membrane which is acted on by the pressure of the exhaust gases, as also shown in U.S. Pat. Nos. 3,195,805 and 3,270,951. Thus when the exhaust-gas manifold pressure exceeds a predetermined limit it will open this bypass valve and thereby relieve some of this pressure to prevent the exhaust-gas turbine from operating the supercharger at such a speed that it feeds excessive air to the engine intake manifold.

The operating characteristic of such an engine is normally fairly simple. The amount of torque produced by the engine, which is almost a direct function of the intake-manifold pressure, increases up to the point where the bypass valve opens. At higher RPM the torque increases only slightly, or even decreases slightly up to the maximum rated RPM for the engine. This is due to the fact that once the valve opens the exhaust-manifold pressure only increases slightly, as a result of the use of a biasing spring which inherently becomes somewhat stiffer as it is compressed. Thus the curve for the exhaust-manifold pressure in a standard such system will be effectively constituted by a slightly upwardly inclined generally straight line, whereas the curves for the intake-manifold pressure and engine torque, which are closely related, will be represently by normally level or slightly falling lines, due to the fact that an RPM above the nominal engine RPM will cause the engine efficiency to drop somewhat.

OBJECTS OF THE INVENTION

It is an object of the instant invention to provide an improved turbocharged engine system and method of operating same.

Another object is to provide such an engine system and method which improves on the principles set forth above and in the above-identified copending application.

Another object is to provide a turbocharged engine system which gives higher output power and torque than the prior-art systems.

SUMMARY OF THE INVENTION

The invention is based on the surprising discovery that below the maximum RPM at which a given internal-combustion engine can be safely operated, and at which normally only a given predetermined maximum pressurization is possible, it is possible to pressurize the intake manifold at an even higher level without damage to the engine, so long as the predetermined maximum pressure at the predetermined maximum speed is not exceeded. Thus below this maximum speed it has been found that a higher pressurization can yield markedly higher engine output torque. The method according to the invention lies basically in the step of generally proportionally decreasing the pressure of the engine exhaust gases with increased engine speed above a predetermined engine speed that is normally higher than that at which the bypass valve of the standard turbocharged engine system described above normally opens at. Thus with the system according to the instant invention the intake-manifold pressure will be increased to a relatively high level, well above that at which the intake manifold can be pressurized safely at the maximum engine RPM, and then this pressurization is steadily decreased with increasing engine RPM or speed to the maximum engine RPM. The result is that the engine according to this invention can be operated with its intake manifold pressurized just below that pressure at which the engine knocks. In these days of increased fuel costs such an increase in engine torque for a given RPM with a given engine size represents a substantial advance.

The engine system according to the instant invention is set up generally as described above with reference to the earlier commonly assigned and copending application. The bypass valve is urged shut in the standard manner by means of a spring. It has, however, a membrane carried on the stem of the valve body which subdivides a chamber into two compartments. The compartment turned away from the valve body, that is the compartment whose pressurization would urge the valve closed and whose depressurization would urge the valve open, is connected to the intake of the supercharger, between the fuel injector and the supercharger. The other compartment which is turned toward the valve body and which therefore is the compartment whose pressurization will tend to open the valve and whose depressurization will tend to close the valve is connected between the output of the supercharger and the intake of the turbine, either to the intake or exhaust manifolds. The effective surface area of the membrane or piston that operates the valve body and the spring forces are set to give the above-described proportionate decrease in exhaust-manifold pressure after the above-described delayed opening of the bypass valve.

According to another feature of this invention the bypass valve has a housing forming a passage that is connected at an upstream side to the exhaust manifold and at a downstream side to a conduit at the output or exhaust of the turbine, normally upstream of the muffler for the engine. The valve body has a flat valve disk movable toward and away from a seat and having a face exposed at the seat to the pressure in the exhaust manifold. In order to prevent fluttering of this valve the overall surface area of the face of the valve is approximately twice that of the area exposed in the valve seat when the valve is closed. Thus when the valve opens and a pressure drop is experienced, the valve will not automatically close since although the pressure is less the surface area against which this pressure is effective is greater so that the valve will continue to retract smoothly. What is more the outer edge of the normally circular valve disk when in the closed position very closely approaches or even slightly touches a frustoconical portion of the seat so that even after the valve opens the pressure does not drop suddenly and precipitously, but will be relieved in a continuously increasing manner. Similarly as the valve closes the pressure will increase in a smooth and continuous manner. This allows the engine to operate overall in a predictable and easy-to-control manner so that the driver of a vehicle equipped with such an engine system need not have to deal with sudden changes in engine speed and torque resulting from sharp variations in exhaust-manifold pressure.

BRIEF DESCRIPTION OF THE DRAWING

FIGS. 1a and 1b are top largely schematic views of the system according to the instant invention;

SPECIFIC DESCRIPTION

Figure 1B:
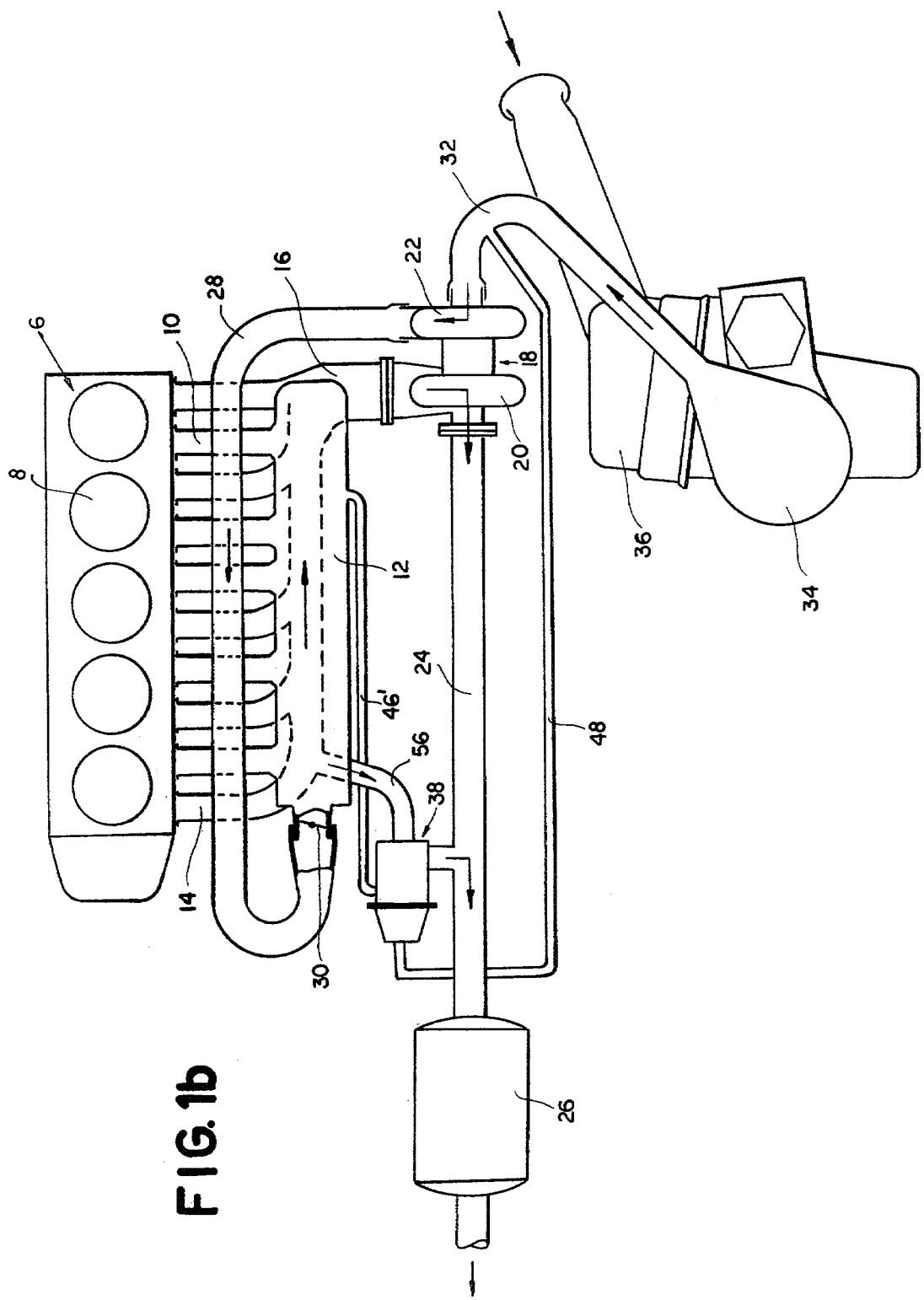

The engine system as shown in FIGS. 1a and 1b basically comprises a fuel-injected engine 6 having 5 cylinders 8 each connected to a respective intake pipe 10 and to a respective exhaust pipe 14. The intake pipes 10 are all in turn connected to an intake manifold and the exhaust pipes 14 are all connected to an exhaust manifold.

The engine 6 is turbocharged by means of a turbocharger 18 comprising an exhaust-gas turbine 20 and a supercharger 22. The outlet of the exhaust-gas turbine 20 is connected via an exhaust pipe 24 to a muffler 26. The output of the supercharger 22 which is driven by the turbine 20 is connected via an intake conduit or pipe 28 having a butterfly-valve flap 30 to the intake manfifold 12. The flap 30 is controlled directly by the motor-vehicle accelerator pedal. The intake of the supercharger 22 is connected via an elbow conduit 32 to a fuel injector system 34 having an air filter 36. This injector 34 is of the Bosch K-Jetronic type.

In addition the engine system according to this invention is provided with a bypass valve 38 connected between the exhaust manifolds 16 upstream of the turbine 20 and the exhaust pipe 24 downstream of the turbine 20. This valve 38 has a valve body 40 connected to a membrane 42 and urged by a spring 44 into a position blocking flow around the turbine 20.

The valve 38 has as will be described below front and back chambers to either side of the membrane 42. The front chamber is connected via a line 46 either to the exhaust manifold immediately upstream of the turbine 20 as shown in FIG. 1a or as shown at 46' in FIG. 1b to the intake manifold 12 downstream of the accelerator valve flap 30. The back chamber is connected via a line 48 to the intake feed elbow 32 of the supercharger 22.

Figure 2:
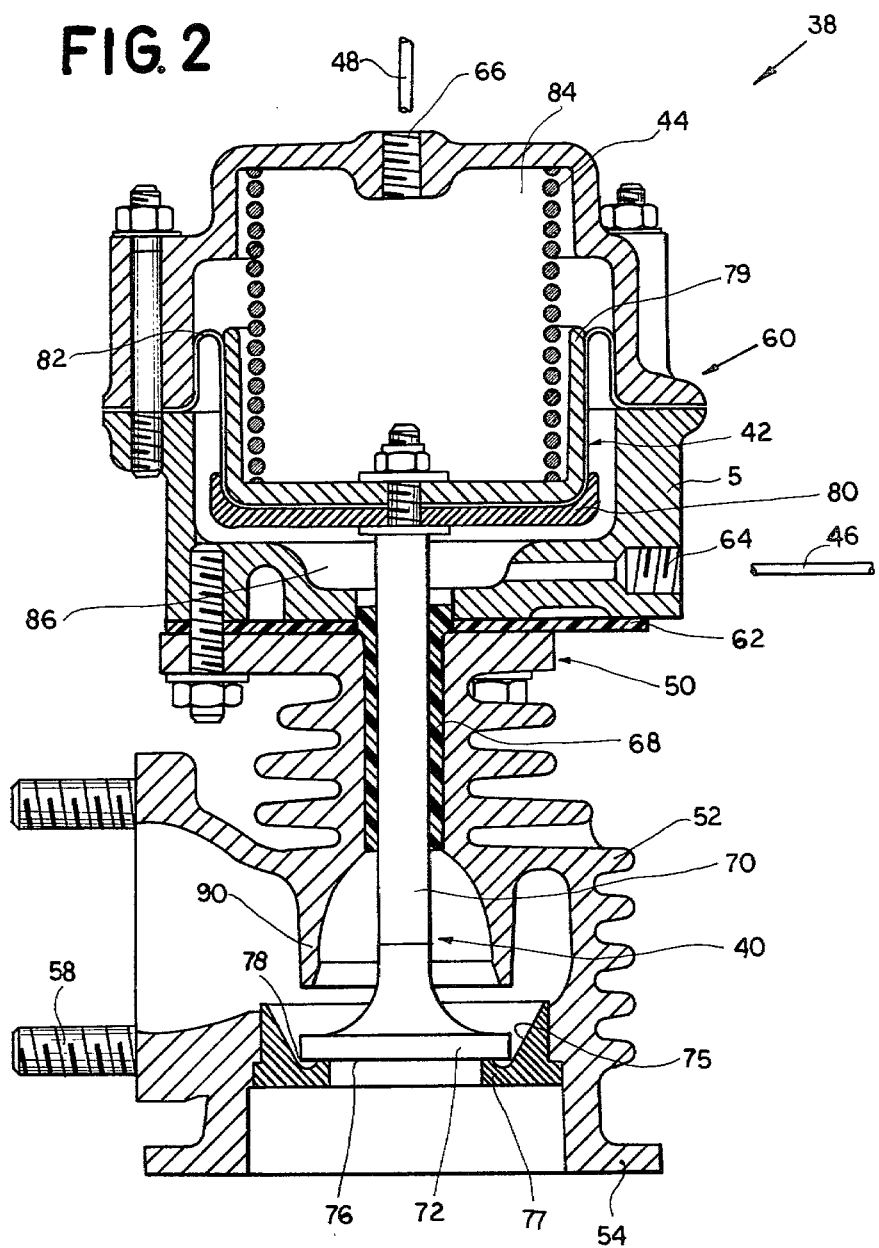
FIG. 2 is an axial section through a bypass valve according to this invention.

FIG. 2 shows the valve 38 in more detail. It has a lower housing part 50 formed with heat-dissipating ribs 52 and a flange 54 by means of which it can be rigidly fixed to a conduit 56 solidly formed on the exhaust manifold 16. It also has threaded studs 58 by means of which it may be bolted directly to the exhaust pipe 24 or to a pipe leading thereto.

The valve 38 also has an upper housing part 60 bolted with interposition of an asbestos disk 62 to the lower part 60 and formed with a front-compartment inlet 64 connected to the conduit 46 and a back-compartment inlet 66 connected to the conduit 48. An insulating and guide sleeve 68 extends between the two housing parts 50 and 60 and receives the cylindrical stem 70 of the valve body 40 which has a valve disk 72 engagable with a seat 77. This valve disk 72 has a face 76 whose surface area is approximately twice as large as the cross-sectional area of the orifice defined by the rim of the seat 77. Furthermore this seat 77 has a frustoconical inner surface 75 so dimensioned that when the valve is closed the outer edge 78 of the face 76 either very closely approaches it or actually touches it. Thus as the valve disk 72 moves axially upwardly away from the seat 77 it will define a continuously and uniformly increasing flow cross-section. There will be no sudden opening with a momentary drop in pressure that could cause the valve body 40 to flutter. When fully open the back face of the disk 76 lies snugly against the rim of a bell-shaped formation 90 in the valve so that leakage up around the stem 70 is virtually impossible.

The upper end of the stem 70 carries a pair of nested cups 79 and 80 sandwiching the inner portion of a highly flexible membrane 82 whose outer periphery is clamped between two parts of the upper housing part 60. The cups 79 and 80 and membrane 82 together form the piston 42 that actuates the valve body 40.

The spring 44 engages between the cup 79 and the upper wall of the housing and lies in a chamber 84 into which opens the conduit 48. To the other side of the piston 42 is a chamber 86 connected to the line 46.

Figure 3:
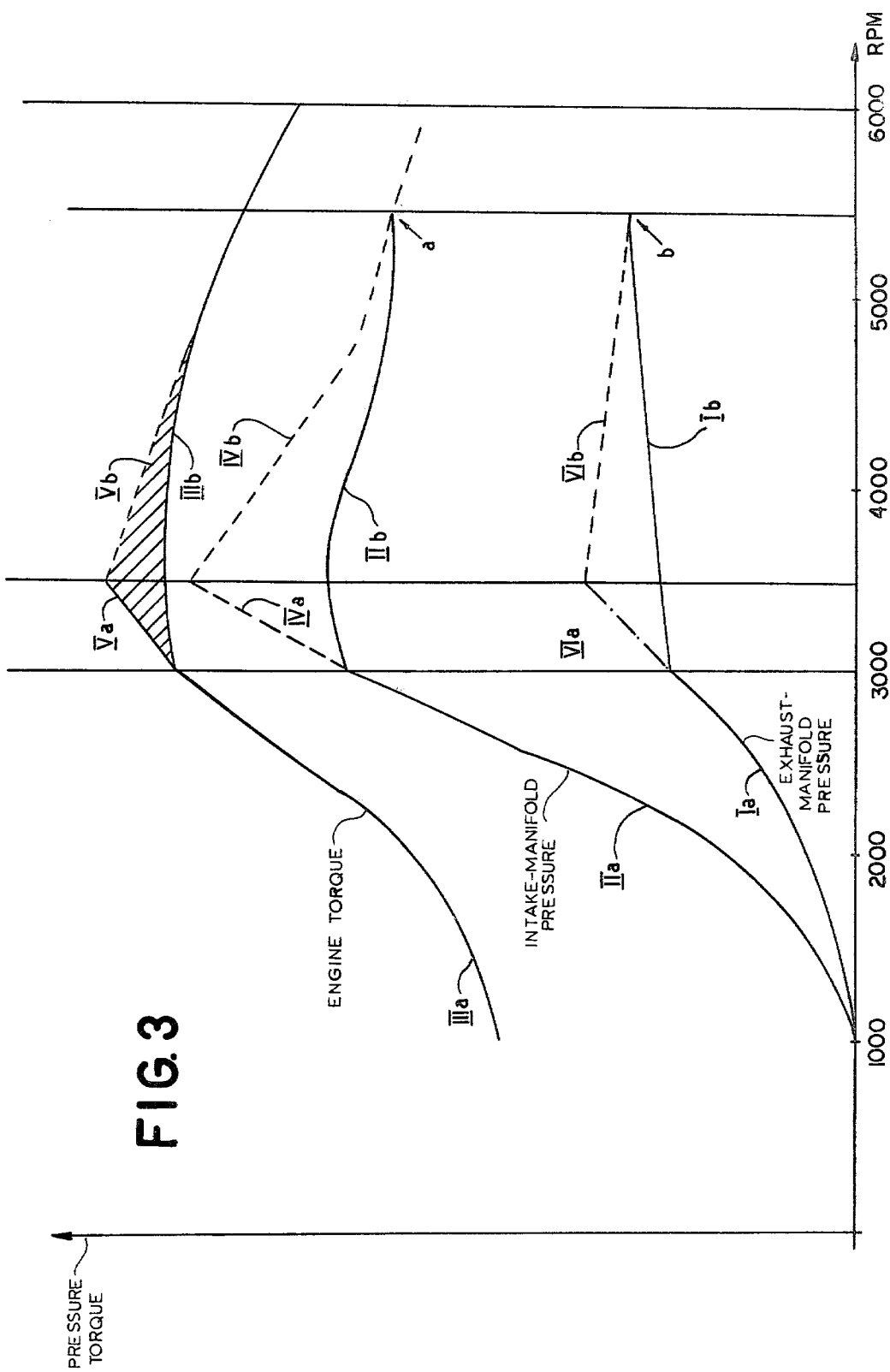
FIG. 3 is a graph illustrating operation of the engine system according to this invention as contrasted with operation of a standard prior-art turbocharged engine system.

The operation of the above-described system will be described with reference at first to FIG. 3 which also illustrates the operation of a standard prior-art system. FIG. 3 shows on the abscissa engine RPM and on the ordinate pressure or torque as will be apparent hereinbelow.

The internal-combustion engine described above normally idles at 1000 RPM, but is only operated under load above 3000 RPM. Furthermore this engine has a maximum rated engine speed of 5300 RPM so that above this speed operation of the motor could result in damage to it. In fact operation above 5000 RPM is rare, and only normally happens during so-called winding out of the engine prior to shifting whereas during normal operation the engine speed is maintained between 3000 and 4500 RPM.

In the engine according to this invention as well as in the standard prior-art engine the valve 38 remains closed below 3000 RPM. Thus the exhaust-pressure shown at curve I$a$ in FIG. 1 increases fairly uniformly to the speed of 3000 RPM. As the supercharger 22 is driven by the turbine 20 that is in turn driven by the exhaust gases the intake-manifold pressure which is created by the supercharger 22 will also rise fairly smoothly as illustrated at curve II$a$ in FIG. 3. The result will be that engine torque will also rise smoothly as illustrated at curve III$a$ in FIG. 3.

Figure 5:
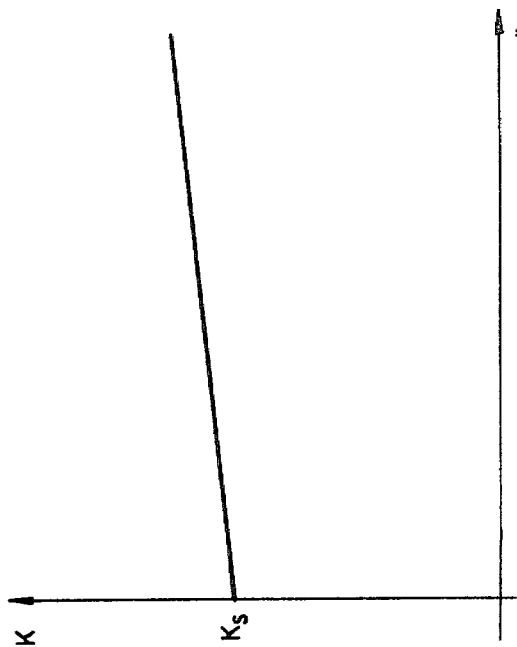
FIG. 5 is a graph illustrating the spring constant of the bypass valve according to the instant invention.

In the prior-art system, or in the system according to this invention with the line 48 disconnected, above 3000 RPM the valve 38 will open. Since the only thing opposing opening of the valve will be the spring 34. Further opening will be determined by the spring constant of the spring 44, illustrated in FIG. 5 which shows that the force $K_s$ that the spring opposes to displacement of the valve body 40 increases almost perfectly uniformly as the height b of the spring is made smaller. Thus above 3000 RPM, the speed at which the bypass valve 38 normally starts to open, the exhaust-manifold pressure will increase almost perfectly uniformly as illustrated at curve I$b$, as it will be directly and exclusively related to the spring constant.

The engine has a maximum speed, as mentioned above, of 5300 RPM. At this speed an experimentally determined maximum pressure indicated at a in FIG. 3 is possible at the intake manifold 12. If this pressure is exceeded knocking will result at 5300 RPM, and it is even possible that the engine can explode if excessive pressure is present in the intake manifold, as spontaneous ignition of the fuel/air mixture is possible. Thus the constant for the spring 44 is so chosen that the straight curve I$b$ terminates at a point b which causes the curve II$b$ for the intake-manifold pressure in the corresponding region between 3000 RPM and 5300 RPM to terminate at the point a. The result of this is that the engine torque will follow the curve III$b$.

As described above, therefore, above approximately 3000 RPM, when the valve 38 starts to open, the exhaust-manifold pressure is allowed to increase slightly, with the result that the intake-manifold pressure will decrease, as will the engine torque. The nonproportionality of the curves I$b$, II$b$, and III$b$ relative to each other between the speeds of 3000 RPM and 5300 RPM is caused by friction and other factors in the engine, but it can generally be said that with uniformly and slightly increasing exhaust-manifold pressure the intake-manifold pressure and engine torque can be counted on to drop in this range.

Figure 4:
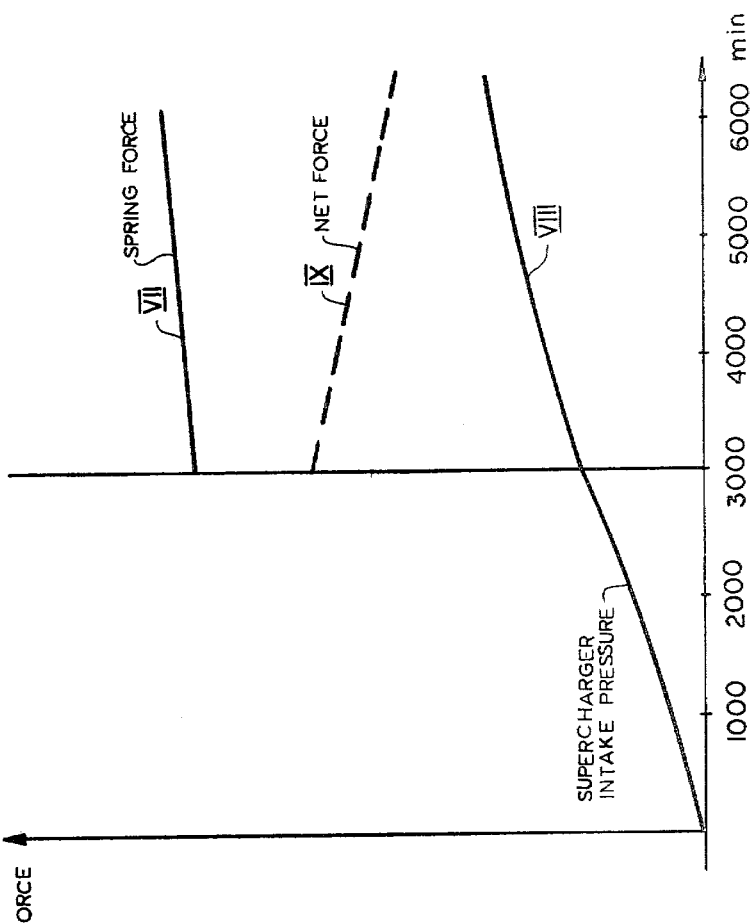
FIG. 4 is a graph illustrating how the operation according to the instant invention is achieved.

According to the instant invention, however, as shown in FIG. 4 the valve body 40 is moved by a combination of two forces. First of all the spring force, which increases steadily, is effective in one direction on the body as shown by line VII in FIG. 4. At the same time, however, the valve body is urged in the exact opposite direction by the low pressure in the line 48, which pressure also decreases steadily with increasing engine speed as shown by line VIII on the graph. Since these two forces oppose each other the net force effective on the valve body will result in the subtraction of the one curve from the other, so that in total the force effective on the valve body 40 is a steadily decreasing force as shown by line IX in FIG. 4. This line IX drops from the time at which the valve normally would open, completely contrary to all prior-art systems.

Applying this to FIG. 3, it can be seen that this decreasing force will have a first principal effect, that of holding the valve 38 closed somewhat longer, normally in this case until the engine reaches 3300 RPM. As a result the exhaust-manifold pressure will continue its steady increase after 3000 RPM as shown by curve VI$a$, with concomitant increase of the intake-manifold pressure as shown at line IV$a$ in FIG. 3 and of the engine torque as shown at line V$a$. Thus the overall engine torque will rise considerably higher with the system according to the instant invention than in the prior-art systems.

Once the valve opens, however, according to the instant invention at 3300 RPM the exhaust-manifold pressure drops off regularly, decreasing uniformly as shown by curve VI$b$ in FIG. 3. This curve VI$b$ is identical to the curve IX of FIG. 4, and is the net result of the countervailing forces effective on the valve body 40. As a result of this continuous and steady decrease in the exhaust-manifold pressure between 3300 RPM and 5300 RPM the intake-manifold pressure will drop generally proportionally as indicated by curve IV$b$. The drop-off in exhaust-manifold pressure is calculated to terminate at point b so that the intake-manifold pressure also terminates at the point a. The net result of all this is that the torque curve will similarly drop off as indicated by curve V$b$. Thus in the critical mid-range region where the engine does most of its work the amount of torque available will be considerably greater as indicated by the hatched area in FIG. 3. For this reason with a given engine of a given cubic displacement it is possible to achieve greater torque than has hitherto been considered possible. This is due mainly to the fact that the amount of supercharging possible at the engine midrange is greater than that possible at the engine's maximum speed.

Thus the system according to the instant invention can greatly increase the horsepower and torque output of an engine without in any way requiring expensive modification of the system, or risking overloading the engine. The size of the piston 42 is calculated relative to the various pressures and to the force of the spring 44 to achieve the exhaust-manifold pressure curve VI$b$ so that the intake-manifold pressure lies just immediately below that pressure at which the engine would knock. Thus the engine is driven at the upper limit of its efficiency for best fuel economy and performance.

I claim:
1. An engine system comprising:
   an internal-combustion engine having an air intake and an exhaust-gas output;
   an exhaust-gas turbine connected to said exhaust-gas output and drivable by the pressure therein at a speed generally proportional to the exhaust-gas pressure;
   a supercharger driven by said turbine and connected to said air intake of said engine to feed air to said engine at a pressure generally proportional to the turbine speed;

a valve connected across said turbine and openable to shunt engine exhaust gases around said turbine and thereby reduce said turbine speed and therewith the pressure at which said supercharger feeds air to said engine, said valve having a valve seat having an inner edge defining a predetermined flow cross-sectional area, said seat being formed with a tapered region, and a valve body having an end face engageable over said seat, of an area substantially greater than said flow cross-sectional area, and having an outer edge lying outside said inner edge of said seat and closely adjacent said tapered region when said valve is closed, said body being movable in a closing direction toward said seat and in an opening direction away from said seat, said outer edge forming with said tapered region an increasingly large flow cross section as said end face pulls away from said seat on displacement of said body in said opening direction, whereby the overall flow cross-section of said valve is uniformly increased as said valve opens; and means responsive to engine speed, connected to said valve, and including a spring urging said valve body in said closing direction, said means being for opening said valve above a predetermined engine speed and for generally proportionally decreasing said exhaust-gas pressure with increasing engine speed above said predetermined engine speed.

2. The system defined in claim 1 wherein said valve includes housing and a piston connected to said valve body and subdivided thereby into a front compartment relatively close to said valve seat and a rear compartment relatively far from said seat.

3. The system defined in claim 2 wherein said means connected to said valve includes a low-pressure conduit extending between said rear compartment and the intake of said supercharger.

4. The system defined in claim 3 wherein said means connected to said valve includes a high-pressure conduit connected between said front compartment and said intake of said engine.

5. The system defined in claim 3 wherein said means connected to said valve includes a high-pressure conduit connected between said front compartment and said exhaust-gas output of said engine.

6. The system defined in claim 1 wherein said area of said end face is equal to generally twice said flow area.

7. The system defined in claim 1 wherein said seat is formed with a tapered region and said end face has an outer edge lying closely adjacent said tapered region when said valve is closed and forming an increasingly large flow cross-section therewith as said end face pulls away from said seat on displacement of said body in said opening direction, whereby the overall flow cross-section of said valve is uniformly increased as said valve opens.

* * * * *